(12) United States Patent
Poster

(10) Patent No.: US 9,683,652 B2
(45) Date of Patent: Jun. 20, 2017

(54) METHOD FOR THE DELIVERY OF LUBRICANT TO A ROTORCRAFT GEARBOX

(71) Applicant: Bell Helicopter Textron Inc., Fort Worth, TX (US)

(72) Inventor: Scott Poster, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 4 days.

(21) Appl. No.: 14/693,334

(22) Filed: Apr. 22, 2015

(65) Prior Publication Data

US 2016/0311527 A1   Oct. 27, 2016

(51) Int. Cl.
   *F16H 57/04*   (2010.01)
   *B64C 27/12*   (2006.01)

(52) U.S. Cl.
   CPC ......... *F16H 57/0435* (2013.01); *B64C 27/12* (2013.01); *F16H 57/04* (2013.01); *F16H 57/0434* (2013.01); *F16H 57/0495* (2013.01)

(58) Field of Classification Search
   CPC .......... F16N 25/02; F16N 27/00; F16N 29/02; F16H 57/0447; F16H 57/0494
   See application file for complete search history.

(56) References Cited

U.S. PATENT DOCUMENTS

| | | | | |
|---|---|---|---|---|
| 5,067,454 A | * | 11/1991 | Waddington | F01D 25/20 123/196 AB |
| 5,121,815 A | * | 6/1992 | Francois | B64C 27/12 184/6.12 |
| 5,344,101 A | * | 9/1994 | Francois | B64C 27/006 184/6.11 |
| 5,381,874 A | * | 1/1995 | Hadank | F16N 29/02 184/6 |
| 6,777,901 B2 | * | 8/2004 | Susono | H02K 7/116 180/65.1 |
| 7,506,724 B2 | * | 3/2009 | Delaloye | F01D 25/18 137/38 |
| 7,931,124 B2 | * | 4/2011 | Glahn | F01D 25/20 184/6.11 |

(Continued)

FOREIGN PATENT DOCUMENTS

| | | | | |
|---|---|---|---|---|
| EP | 2679491 B1 | 1/2014 | | |
| FR | 2685758 A1 | * | 7/1993 | ........... B64C 27/006 |

OTHER PUBLICATIONS

Search Report in related European Patent Application No. 15170121.6, dated Jan. 20, 2016.

(Continued)

*Primary Examiner* — Joseph W Sanderson
(74) *Attorney, Agent, or Firm* — Alison A. Woodruff

(57) ABSTRACT

A rotorcraft includes a body, a rotor blade, and a power train coupled to the body and operable to rotate the rotor blade. The power train includes an engine, a gearbox in mechanical communication with the engine, and a driveshaft in mechanical communication with the gearbox. The rotorcraft also includes a sensor operable to detect a rotorcraft parameter, and a lubrication flow calculation unit operable to receive the rotorcraft parameter, generate the flow rate based on the rotorcraft parameter, and transmit the flow rate to a lubrication system configured to deliver lubricant to the gearbox at the transmitted flow rate.

20 Claims, 4 Drawing Sheets

(56) References Cited

U.S. PATENT DOCUMENTS

| | | | | |
|---|---|---|---|---|
| 8,602,166 | B2* | 12/2013 | Mullen | B64C 27/14 |
| | | | | 184/6.12 |
| 8,746,404 | B2* | 6/2014 | Allam | F01D 17/08 |
| | | | | 184/1.5 |
| 9,316,630 | B2* | 4/2016 | Hodgkinson | G01N 33/2835 |
| 2003/0048085 | A1* | 3/2003 | Susono | H02K 7/116 |
| | | | | 318/274 |
| 2004/0040789 | A1* | 3/2004 | Rake | F16N 29/02 |
| | | | | 184/6.23 |
| 2007/0261922 | A1 | 11/2007 | Mullen | |
| 2009/0152051 | A1* | 6/2009 | Glahn | F01D 25/20 |
| | | | | 184/6.11 |
| 2011/0138817 | A1 | 6/2011 | Vialle | |
| 2012/0227820 | A1 | 9/2012 | Poster | |
| 2014/0001307 | A1* | 1/2014 | Ehinger | B64C 27/12 |
| | | | | 244/17.11 |
| 2015/0129361 | A1* | 5/2015 | Hodgkinson | G01N 33/2888 |
| | | | | 184/6.4 |
| 2015/0179030 | A1* | 6/2015 | Mottershead | G01H 1/12 |
| | | | | 340/679 |

OTHER PUBLICATIONS

Examination Report in related European Patent Application No. 15170121.6, dated Jan. 2, 2016.

* cited by examiner

METHOD FOR THE DELIVERY OF LUBRICANT TO A ROTORCRAFT GEARBOX

TECHNICAL FIELD

This invention relates generally to a rotorcraft, and more particularly, to a method for the delivery of lubricant to a rotorcraft gearbox.

BACKGROUND

A rotorcraft may include one or more rotor systems. One example of a rotorcraft rotor system is a main rotor system. A main rotor system may generate aerodynamic lift to support the weight of the rotorcraft in flight, and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include a gearbox that transmits energy from a power source to the rotor blades.

SUMMARY

Particular embodiments of the present disclosure may provide one or more technical advantages. A technical advantage of one embodiment may include the capability to deliver lubricant to a gearbox when the rotorcraft experiences a reduction in lubricant pressure. A technical advantage of one embodiment may include the capability to reduce the friction experienced by the gearbox when the rotorcraft experiences a reduction in lubricant pressure. A technical advantage of one embodiment may include the capability to increase the amount of time that the rotorcraft can operate with a reduced lubricant pressure.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
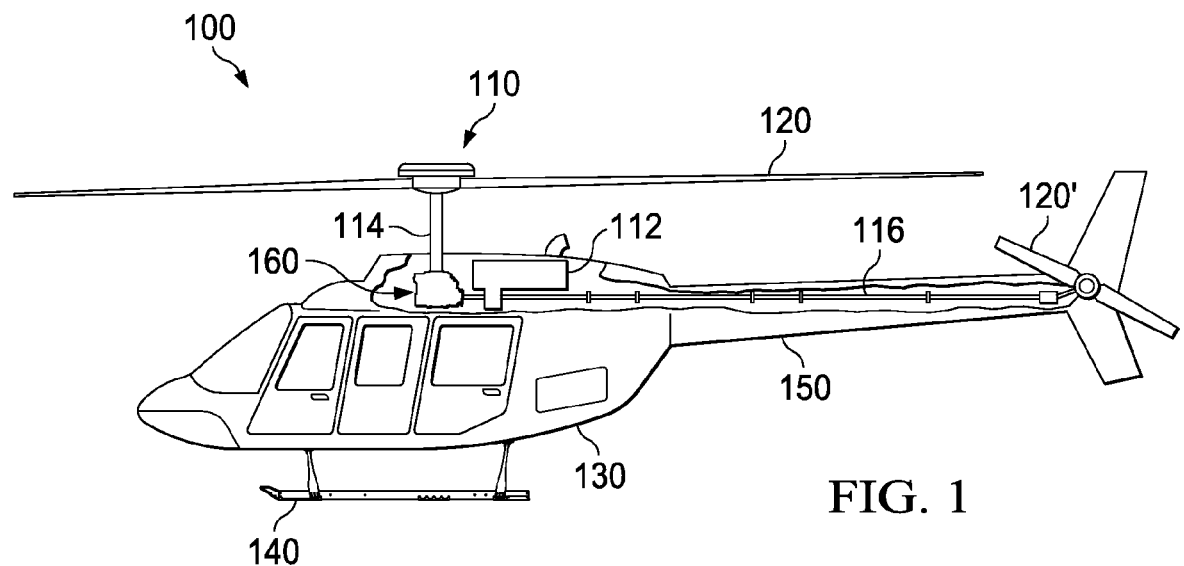
FIG. 1 shows a rotorcraft according to one example embodiment.
Figure 2:
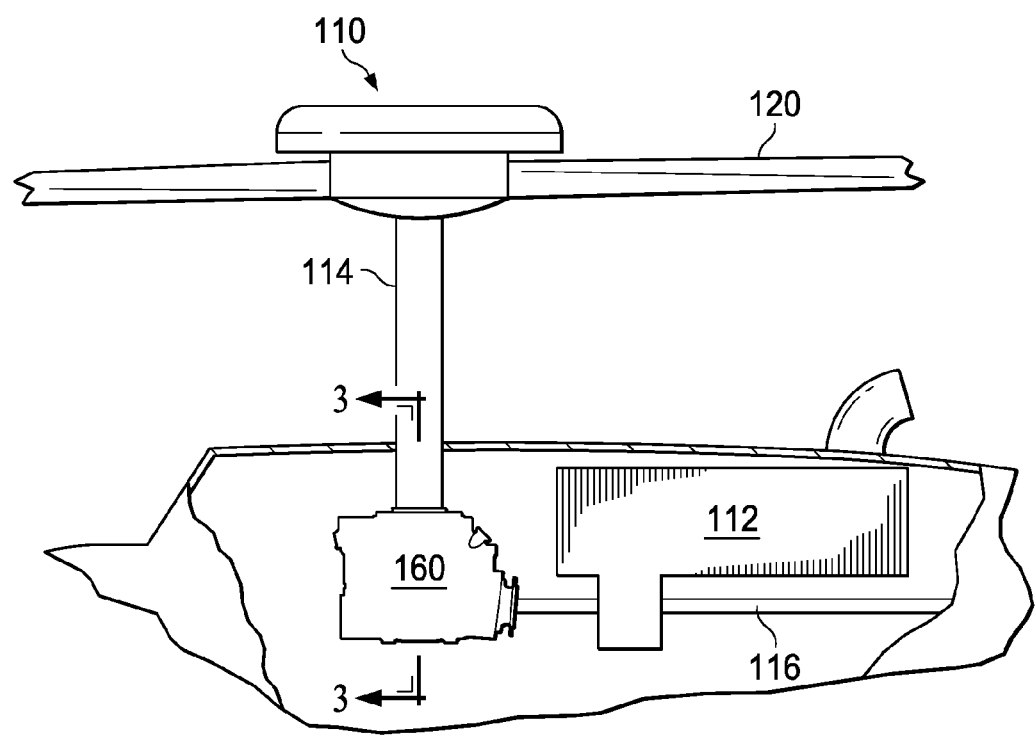
FIG. 2 shows the power train system of the rotorcraft of FIG. 1.

FIG. 1 shows a rotorcraft 100 according to one example embodiment. Rotorcraft 100 features power train system 110, main rotor blades 120, tail rotor blades 120', a fuselage 130, a landing gear 140, and an empennage 150. Power train system 110 may rotate blades 120 and/or blades 120'. FIG. 2 shows the power train system 110 of FIG. 1.

In the example of FIGS. 1 and 2, power train system 110 includes an engine 112, a gearbox 160, a rotor mast 114, and a tail rotor drive shaft 116. Engine 112 supplies torque to mast 114, via gearbox 160, for rotating of blades 120. Engine 112 also supplies torque to tail rotor drive shaft 116 for rotating blades 120'. In the examples of FIGS. 1 and 2, gearbox 160 is a main rotor transmission system. Teachings of certain embodiments recognize, however, that power train system 110 may include more or different gearboxes than gearbox 160 shown in FIG. 1. Power train system 110 may include a control system for selectively controlling the pitch of each blade 120 in order to selectively control direction, thrust, and lift of rotorcraft 100.

Fuselage 130 represents the body of rotorcraft 100 and may be coupled to power train system 110 such that power train system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features blades 120'. Power train system 110 and blades 120' may collectively provide thrust in the same direction as the rotation of blades 120 so as to counter the torque effect created by blades 120. It should be appreciated that teachings from rotorcraft 100 may apply to aircraft other than rotorcraft, such as airplanes, tilt rotors, unmanned aircraft, to name a few examples. In addition, teachings of certain embodiments relating to rotor systems described herein may apply to power train system 110 and/or other power train systems, including but not limited to non-rotorcraft power train systems.

A gearbox, such as gearbox 160, may transmit power from a power source (e.g., engine 112) to an object to be moved. A gearbox may convert speed and torque between the power source and the object to be moved. One example of a gearbox may include a gearbox that can be configured to reduce the speed of the rotational output of the engine.

A gearbox may include various gears and bearings. A gear is a rotating part having teeth that mesh with another toothed part in order to transmit torque. Gears in a gearbox may be used to provide speed and torque conversions. A bearing may include any of various machine elements that constrain the relative motion between two or more parts to only the desired motion. Bearings in a gearbox may perform tasks such as supporting a gear shaft.

Gears, bearings, and other mechanical components of a gearbox are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as lubricant, between the surfaces to help carry the load (pressure generated) between the opposing surfaces.

A lubricant is a substance introduced to reduce friction between moving surfaces. Examples of lubricants include oil, biolubricants derived from plants and animals, synthetic oils, solid lubricants, and aqueous lubricants. Example transmission oils for gearbox 160 may include oils meeting specifications MIL-PRF-23699 (5 cSt), DOD-L-7808 (3-4 cSt), DOD-PRF-85734 (5 cSt), and other oils in the 9 cSt to 10 cSt viscosity range.

Figure 3:
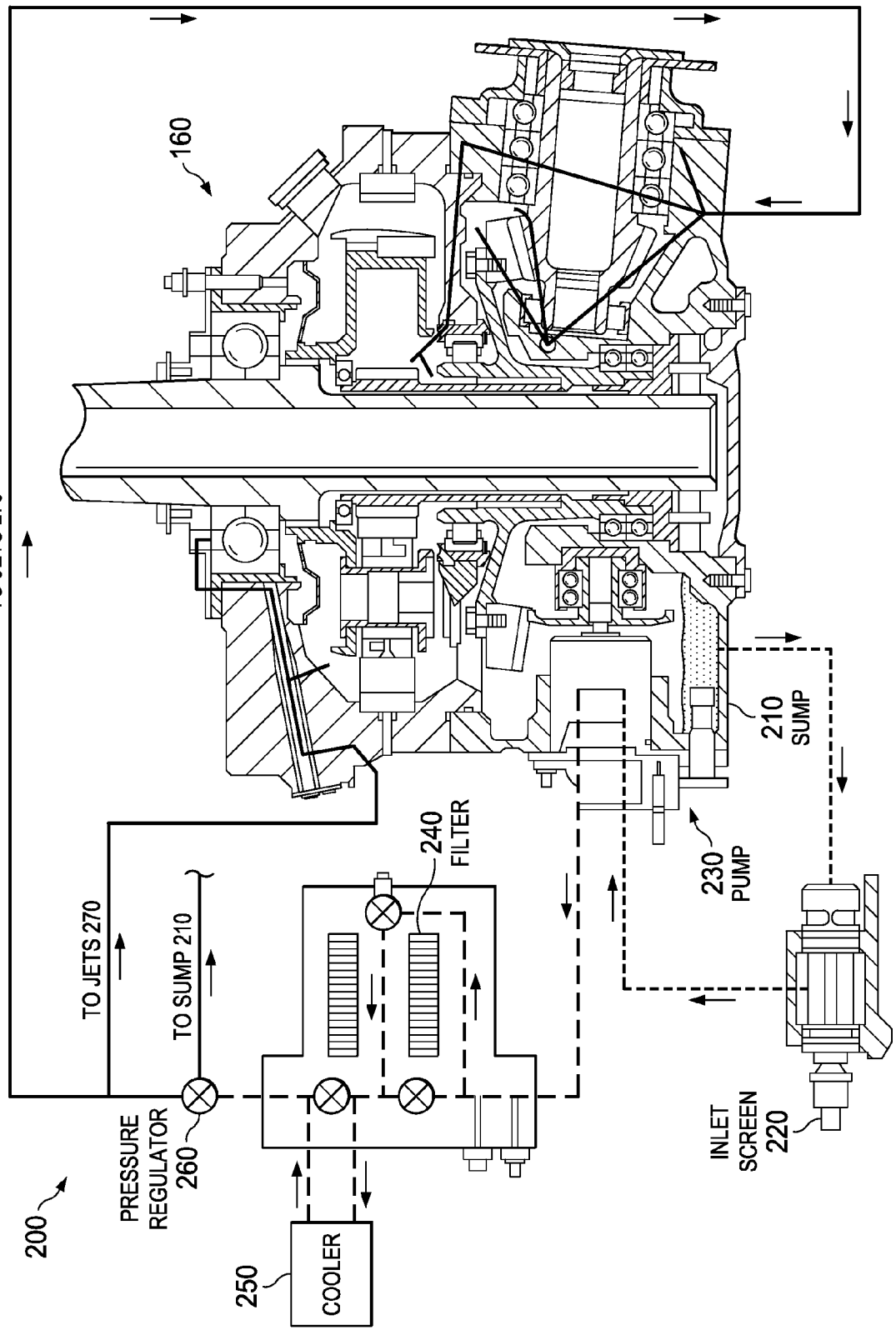
FIG. 3 shows a lubrication system operable to lubricate a gearbox.

Power train system 110 may include one or more lubrication systems to provide lubricant to the mechanical components of a gearbox, such as gearbox 160. FIG. 3 shows a lubrication system 200 according to one example embodiment. Lubrication system 200 features a lubricant sump 210, a lubricant inlet screen 220, a pump 230, a filter 240, a lubricant cooler 250, a pressure regulator 260, and jets 270. Other embodiments of lubrication system 200 may contain more, fewer, or different components. Embodiments of lubrication system 200 may be pressurized or unpressurized. For example, jets 270 may dispense either pressurized or unpressurized lubricant on a part.

Lubricant sump 210 may be a reservoir that stores lubricant within lubrication system 200. Sump 210 may be integral with the housing of gearbox 160 (as shown in FIG. 3) or separate from the housing of gearbox 160. Lubricant inlet screen 220 may be a filter that removes the largest particulates from the lubricant. Pump 230 may circulate lubricant under pressure throughout lubrication system 200. Filter 240 may remove some contaminants from the lubricant. Lubricant cooler 250 may lower the temperature of the lubricant before the lubricant is applied to the various components that generate heat. Pressure regulator 260 may measure the lubricant pressure within lubrication system 200 and diverts excess lubricant back to lubricant sump 210 if the lubricant pressure is too high. Jets 270 may dispense lubricant on components of gearbox 160 that are subject to friction and/or generate heat, such as gears and bearings.

Rotorcraft 100 or power train system 110 may also include one or more sensors 410. Sensor 410 may represent any device that can be configured to detect one or more rotorcraft parameters 415 output by rotorcraft 100 or power train system 110.

For example, sensor 410 may represent a speed sensor. Examples of speed sensors may include a variable reluctance sensor, a hall-effect sensor, a magnetoresistive sensor, a giant magnetoresistance sensor, and an eddy current sensor, to name a few. Speed sensor 410 may detect the rotational speed of a shaft of power train system 110. For example, speed sensor 410 may detect the rotational speed of an output shaft of engine 112, an input shaft of gearbox 160, or mast 114.

In another example embodiment, sensor 410 may be a pressure sensor that can be configured to detect the pressure of the lubricant in gearbox 160. Examples of pressure sensors may include strain-gauge sensors, capacitive sensors, electromagnetic sensors, piezoelectric sensors, optical sensors, potentiometric sensors, resonant sensors, and thermal sensors, to name a few.

In another example embodiment, sensor 410 may be a temperature sensor that can be configured to detect the temperature of the lubricant in gearbox 160.

In another example embodiment, sensor 410 may be a sound sensor. An example of a sound sensor may be an acoustic emission sensor. Sounds sensor 410 may detect the sound emitted from gearbox 160.

In yet another example, sensor 410 may represent a vibration sensor configured to detect the vibration of the structure to which it is mounted. An example of a vibration sensor may be a piezoelectric accelerometer. Vibration sensor 410 may detect the vibration of gearbox 160.

It should be noted that power train system 110 or rotorcraft 100 may include a plurality of sensors 410 which may be of different types. For example, power train system 110 could include a speed sensor 410 and a temperature sensor 410.

Under normal operating conditions, pump 230 may provide proper lubrication to gearbox 160 and the lubricant pressure within gearbox 160 may be at a normal level, for example, fifty PSI (pounds per square inch). However, in cases where proper lubrication is not provided to gearbox 160, or gearbox 160 experiences a loss of lubricant, gearbox 160 may experience excessive wear and failure of components of gearbox 160. One example cause of a loss of lubricant may be a leak between the casing of gearbox 160 and one of its components. In some loss of lubrication circumstances, the lubricant pressure within gearbox 160 may be reduced to an undesired level. For example, the pressure may drop below thirty PSI, and in some instances may drop to zero PSI.

Rotorcraft are generally required to maintain manageable flight operations for selected durations of time if the rotorcraft experiences low lubricant pressure, such as during a loss of lubricant situation or lubrication system failure. For example, an aviation agency may require that the loss of lubricant will not prevent continued safe operation for at least thirty minutes after perception by the flight crew of the lubrication system failure or loss of lubricant.

Figure 4:
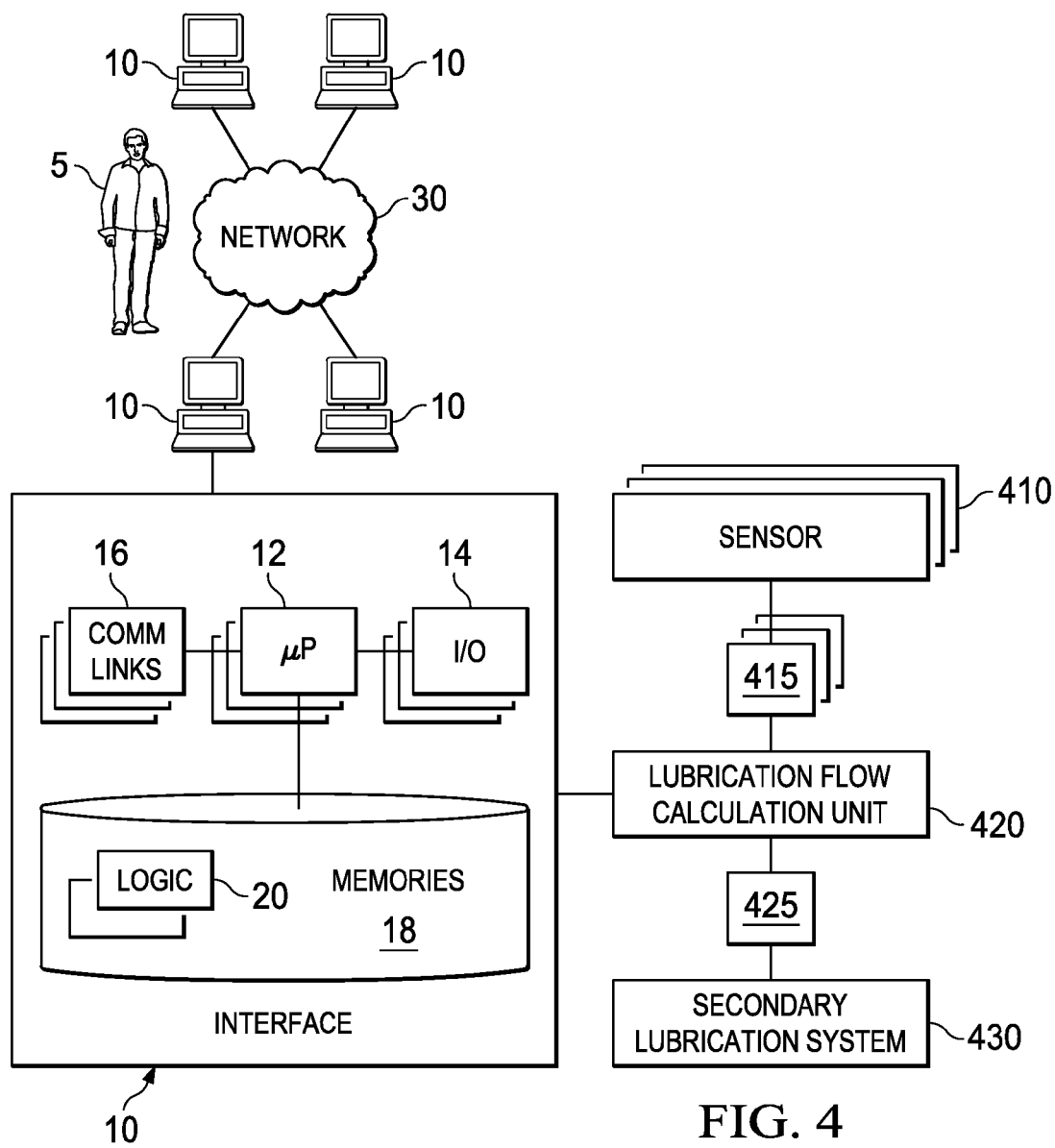
FIG. 4 features a lubrication flow calculation unit.

Now referring to FIG. 4, one method used to satisfy the requirements of manageable flight during loss of lubricant or a lubrication system failure may be to use a lubrication flow calculation unit 420 to determine the flow rate 425 of lubricant a secondary lubrication system 430 provides to gearbox 160. One example of a secondary lubrication system 430 may include the emergency subsystem 307 disclosed in U.S. Patent Publication No. 2012/0227820, which is hereby incorporated by reference in its entirety. The lubricant to the secondary lubrication system 430 may be provided from a second lubrication reservoir and a pressurizing device. Examples of a pressurizing device may be a pump, a hydraulic pressure valve, or a gravity feed system.

In one example embodiment, lubricant may be introduced from the secondary lubrication system 430 to gearbox 160 at a constant steady rate. In another example embodiment, lubricant may be introduced from the secondary lubrication system 430 at a rate determined by the amount of fluid in the secondary lubrication system 430. For example, as the amount of lubricant in the secondary lubrication system 430 decreases, the system delivers less lubricant over time.

Even though these methods have some advantages, such as increasing the amount of time the rotorcraft is operable, these methods may not provide enough lubricant for the total duration of the operation of the rotorcraft. For example, these methods may not conserve the lubricant sufficiently and may allow an excessive amount of lubricant to be wasted if the low lubricant pressure is caused by a leak between the casing of gearbox 160 and one of its components, or if the aircraft is in a flight condition that does not require additional lubrication and/or cooling.

Teachings of certain embodiments recognize the ability for lubrication flow calculation unit 420 to determine the flow of lubricant that secondary lubrication system 430 will provide to a gearbox, such as gearbox 160, based on a rotorcraft parameter 415 received from sensor 410. Rotorcraft parameter 415 may represent variables such as the airspeed of rotorcraft 100, the rotational speed of a shaft of rotorcraft 100, the vibration of gearbox 160, the temperature of the components and/or lubricant of gearbox 160, and/or the sound emitted from gearbox 160.

Figure 5:
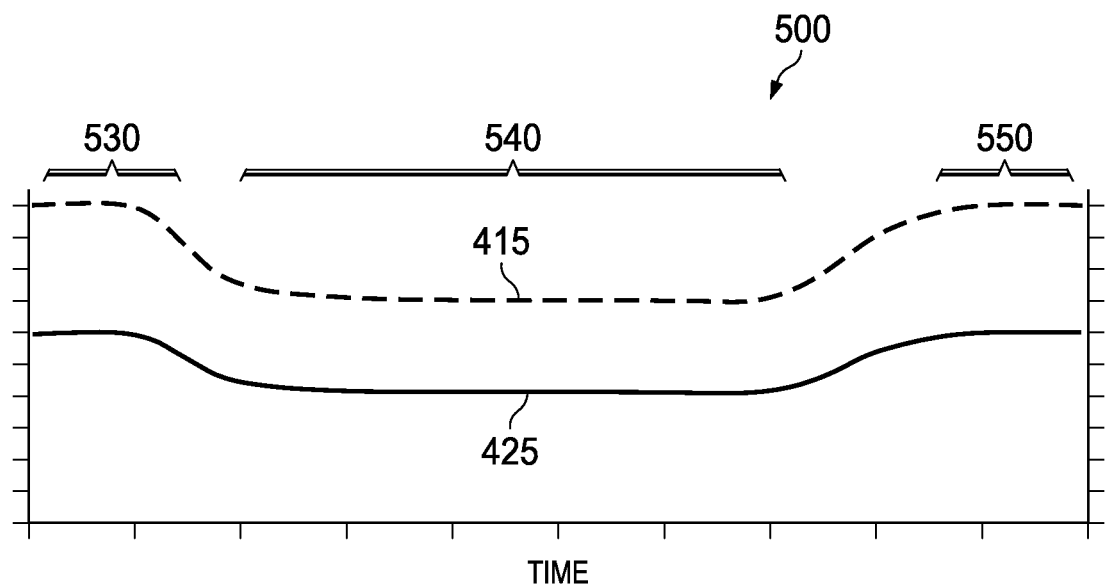
FIG. 5 features a graph showing lubrication flow in relation to a rotorcraft parameter.

Now referring to FIG. 5, graph 500 may represent the flow rate 425 of lubricant provided to gearbox 160 over time, in relation to a rotorcraft parameter 415 over time. In one example, which is depicted in FIG. 5, rotorcraft parameter 415 may represent the rotational speed of mast 114 of rotorcraft 100. Rotorcraft 100 may initially be flying such that the rotational speed of mast 114 is at approximately one-hundred percent, in phase 530. After a reduction in lubricant pressure is detected, a pilot of rotorcraft 100 may reduce the rotational speed of mast 114 to approximately seventy percent, in cruise phase 540. Once rotorcraft 100 is located in an area where rotorcraft 100 may land safely, the pilot of rotorcraft 100 may increase the rotational speed of mast 114, in phase 550, back to approximately one-hundred percent so that rotorcraft 100 may land.

In this example, when the rotational speed of mast 114 approaches one-hundred percent in phases 530 and 550, the flow rate 425 of lubricant to the gearboxes may be approximately six-hundred cubic centimeters per minute. When the rotational speed of mast 114 is at seventy percent in cruise phase 540, the flow rate 425 of lubricant to gearbox 160 may be approximately four-hundred cubic centimeters per minute.

Teachings of certain embodiments recognize that flow rate 425 may vary depending on several factors. For example, flow rate 425 may vary depending on the weight of the rotorcraft, the design and size of the gearbox, operating conditions, and operator preferences. Therefore, FIG. 5 is just one example and other ratios of flow rate 425 versus rotorcraft parameter 415 are contemplated.

Teachings of certain embodiments recognize the capability to determine flow rate 425 by several different methods. One method may be to calculate flow rate 425 based on a specified ratio and the rotorcraft parameter 415. Another method may be to use a table of each rotorcraft parameter 415 values with corresponding flow rate 425 values.

Figure 6:
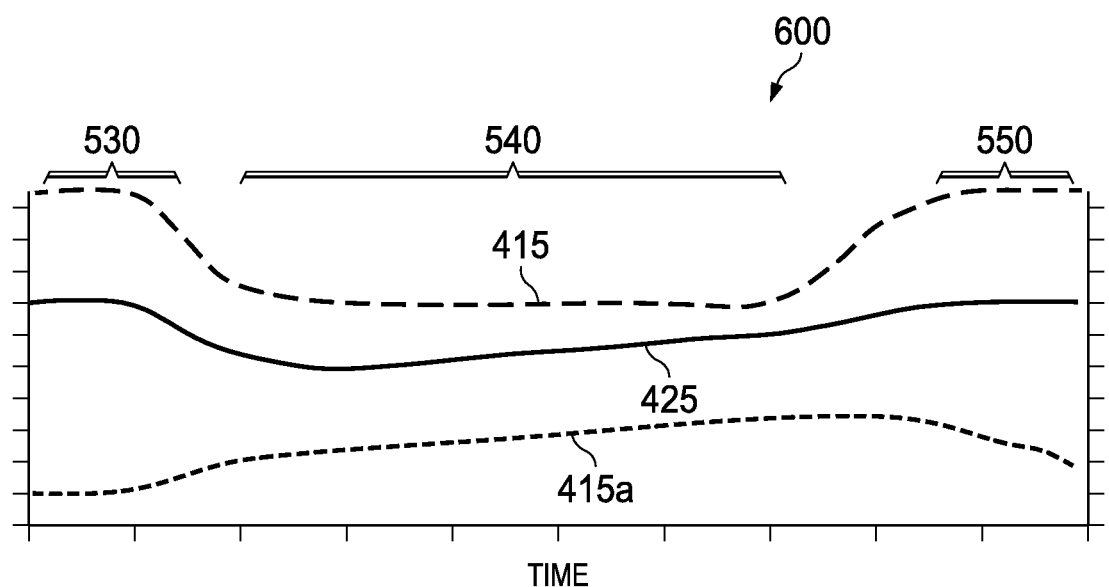
FIG. 6 features a graph showing lubrication flow in relation to two different rotorcraft parameters.

Additionally, more than one rotorcraft parameter 415 may be used by lubrication flow calculation unit 420 to determine flow rate 425. Now referring to graph 600 in FIG. 6, rotorcraft parameter 415 may represent the rotational speed of mast 114, and rotorcraft parameter 415*a* may represent the temperature of the lubricant in gearbox 160. Therefore, a combination of speed of mast 114 and temperature of lubricant in gearbox 160 may be used by lubrication flow calculation unit 420 to determine flow rate 425.

Now referring back to FIG. 4, teachings of certain embodiments recognize that lubrication flow calculation unit 420 may be implemented by one or more computers 10 communicating across one or more networks 30 and accessible by a user 5. An example of computer system 10 may include, but is not limited to, a flight control computer installed on-board an aircraft such as rotorcraft 100. In various embodiments, elements of lubrication flow calculation unit 420 may be installed on-board an aircraft, off-board (such as at a ground facility), or a combination of the two. For example, in one embodiment, some elements of lubrication flow calculation unit 420 are installed on-board the aircraft whereas other elements of lubrication flow calculation unit 420 are installed off-board such that an on-board computer may include the capability to calculate flow rate 425 during flight as well as the capability to upload/download information to an off-board computer between flights.

Computer system 10 may be used by lubrication flow calculation unit 420 to input the rotorcraft parameter 415 from one or more sensors 410, determine lubrication flow rate 425, and instruct secondary lubrication system 430 to adjust the flow rate 425 to gearbox 160. Users 5 may access lubrication flow calculation unit 420 through computer systems 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a rotor blade;
   a power train coupled to the body and operable to rotate the rotor blade, the power train comprising:
      an engine;
      a gearbox in mechanical communication with the engine; and
      a driveshaft in mechanical communication with the gearbox;
   a sensor operable to detect a rotorcraft parameter;
   a main lubrication system configured to deliver lubricant to the gearbox, the main lubrication system comprising a main lubrication reservoir and a main pressurizing device;
   a secondary lubrication system configured to deliver lubricant to the gearbox, the secondary lubrication system comprising a secondary lubrication reservoir and a secondary pressurizing device; and
   a lubrication flow calculation unit operable to:
      receive the rotorcraft parameter;
      generate a flow rate based on the rotorcraft parameter, wherein the flow rate increases the amount of time that the rotorcraft can operate when the gearbox experiences a reduction in lubricant pressure; and
      transmit the flow rate to the secondary lubrication system;
   wherein one of the primary and secondary lubrication systems delivers lubricant to the gearbox at the generated flow rate.

2. The rotorcraft of claim 1, wherein the lubrication flow calculation unit generates the flow rate by calculating the flow rate based on a ratio and the rotorcraft parameter.

3. The rotorcraft of claim 1, wherein the lubrication flow calculation unit generates the flow rate by use of a look-up table, the look-up table having flow rate values for each corresponding rotorcraft parameter value.

4. The rotorcraft of claim 1, wherein the sensor is a speed sensor configured to detect a rotational speed of the driveshaft, the rotorcraft parameter is the rotational speed of the driveshaft, and the flow rate is generated based on the rotational speed of the driveshaft such that as the rotational speed of the driveshaft reduces, the flow rate is reduced.

5. The rotorcraft of claim 1, wherein the sensor is a pressure sensor configured to detect a lubricant pressure in the gearbox, and the rotorcraft parameter is the lubricant pressure in the gearbox.

6. The rotorcraft of claim 1, wherein the sensor is a vibration sensor configured to detect a vibration in the gearbox, and the rotorcraft parameter is the vibration in the gearbox.

7. The rotorcraft of claim 1, further comprising a second sensor operable to detect a second rotorcraft parameter, wherein the lubrication flow calculation is operable to:
   receive the rotorcraft parameter and the second rotorcraft parameter;
   generate the flow rate based on the rotorcraft parameter and the second rotorcraft parameter; and
   transmit the flow rate to the lubrication system.

8. The rotorcraft of claim 7, wherein the rotorcraft parameter is a rotational speed of the driveshaft, the second rotorcraft parameter is a temperature of the lubricant in the gearbox, and the flow rate is generated based on the rotational speed of the driveshaft and the temperature of the lubricant in the gearbox.

9. The rotorcraft of claim 1, wherein the lubrication flow calculation unit transmits the flow rate when an oil pressure of the gearbox is less than a threshold value, and does not transmit the flow rate when the oil pressure of the gearbox is above the threshold value.

10. The rotorcraft of claim 9, wherein the threshold value is thirty pounds per square inch.

11. The rotorcraft of claim 1, wherein the secondary lubrication system delivers lubricant to the gearbox at the generated flow rate.

12. A method comprising:
   providing a body;
   providing a rotor blade;

providing a power train coupled to the body and operable to rotate the rotor blade, the power train comprising:
an engine;
a gearbox in mechanical communication with the engine; and
a driveshaft in mechanical communication with the gearbox;
providing a sensor operable to detect a rotorcraft parameter;
providing a main lubrication system configured to deliver lubricant to the gearbox, the main lubrication system comprising a main lubrication reservoir and a main pressurizing device;
providing a secondary lubrication system configured to deliver lubricant to the gearbox, the secondary lubrication system comprising a secondary lubrication reservoir and a secondary pressurizing device;
receiving the rotorcraft parameter from the sensor;
generating a flow rate based on the rotorcraft parameter, wherein the flow rate increases the amount of time that the rotorcraft can operate when the gearbox experiences a reduction in lubricant pressure; and
instructing one of the primary and secondary lubrication systems to deliver lubricant to the gearbox at the generated flow rate.

13. The method of claim 12, wherein the sensor is a speed sensor configured to detect a rotational speed of the driveshaft, and the rotorcraft parameter is the rotational speed of the driveshaft.

14. The rotorcraft of claim 12, wherein the sensor is a pressure sensor configured to detect a lubricant pressure in the gearbox, and the rotorcraft parameter is the lubricant pressure in the gearbox.

15. The method of claim 12, wherein the sensor is a vibration sensor configured to detect a vibration in the gearbox, and the rotorcraft parameter is the vibration in the gearbox.

16. The method of claim 12, further comprising:
providing a second sensor operable to detect a second rotorcraft parameter, wherein the step of generating the flow rate is based on the rotorcraft parameter and the second rotorcraft parameter.

17. The method of claim 16, wherein the rotorcraft parameter is a speed of a mast of the rotorcraft, and the second rotorcraft parameter is a temperature of a gearbox component.

18. The method of claim 12, wherein instructing a lubrication system to deliver lubricant to the gearbox at the generated flow rate occurs when an oil pressure of the gearbox is less than a threshold value, and the instructing step does not occur when the oil pressure of the gearbox is above the threshold value.

19. The method of claim 18, wherein the threshold value is thirty pounds per square inch.

20. The method of claim 12, wherein the instructing step includes instructing the secondary lubrication system to deliver lubricant to the gearbox at the generated flow rate.

* * * * *